Sept. 10, 1957 C. J. NEUMAN 2,805,797
GREASE GUNS
Filed Dec. 1, 1954
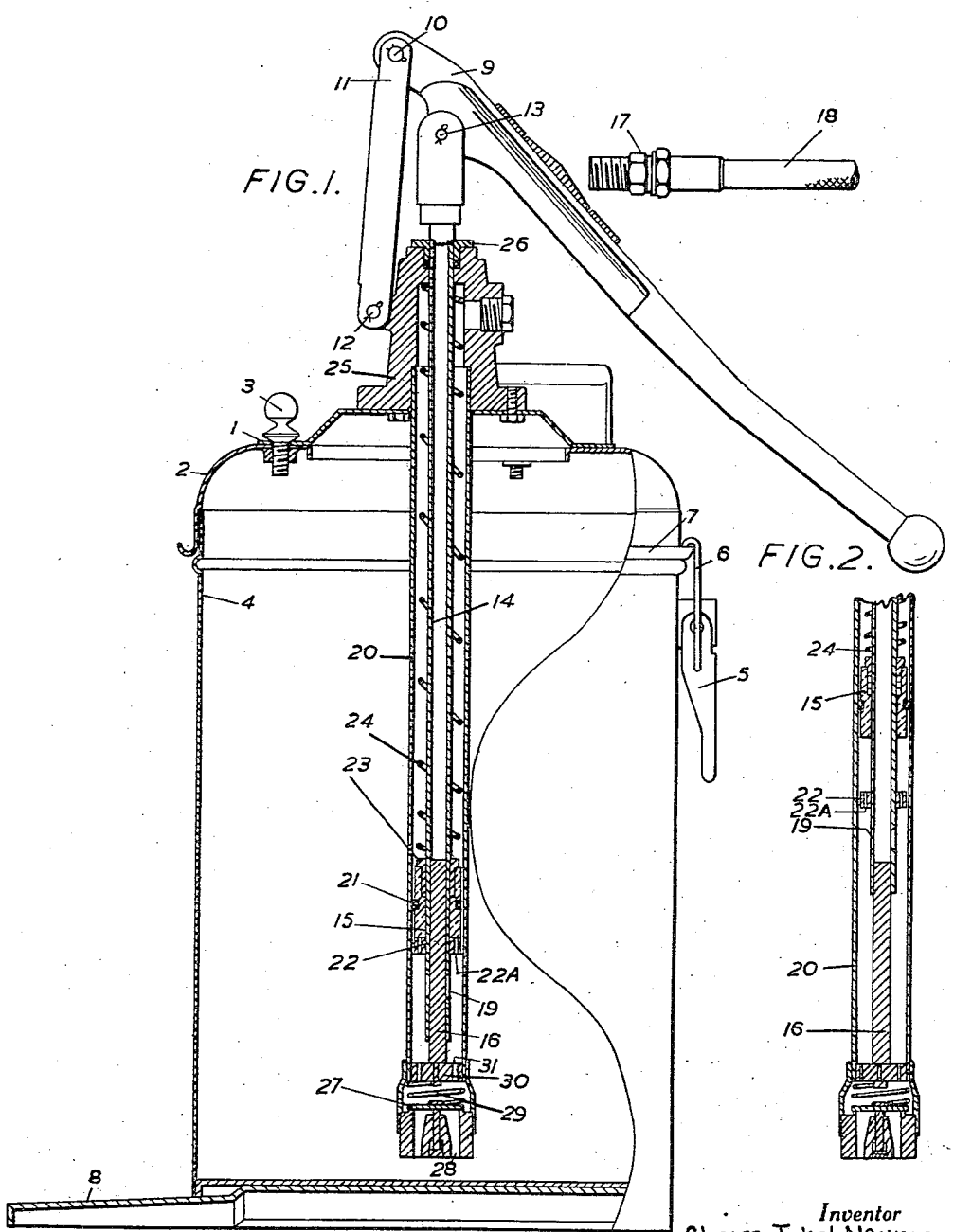
Inventor
Chaim Jakob Neuman
By
Richardson, ...
his Attorneys

United States Patent Office 2,805,797
Patented Sept. 10, 1957

2,805,797

GREASE GUNS

Chaim Jakob Neuman, South Croydon, England

Application December 1, 1954, Serial No. 472,485

Claims priority, application Great Britain December 4, 1953

4 Claims. (Cl. 222—253)

This invention relates to devices for the delivery of liquid or semi-liquid materials (hereinafter referred to as "grease") under pressure and is concerned more especially with a lubricator such as an agricultural plant and tractor lubricator. It will, however, be appreciated that it is applicable to grease delivery devices of very many kinds.

Grease guns are already known in which there is a reservoir for the grease, a smaller compression cylinder with a piston working therein, means for operating the piston, and a spring pressed plunger working in the reservoir and tending to force grease from the reservoir into the pressure cylinder. It is also known to mount a low pressure grease gun on a platform, which platform is intended itself to be mounted on a large grease container, such as a heavy oil drum or barrel, and transferred to a new container when the old one is empty. Such constructions, however, have in practice either necessitated using oil or light grease for which low pressure is sufficient, or using a gun which has to be re-charged by hand fairly frequently.

The object of this invention is to provide a grease gun capable of delivering grease at high pressure but which will be self-charging.

A grease gun made in accordance with this invention comprises a high pressure compression cylinder in which works a piston, means for causing relative reciprocation by a prime mover (such as a hand lever), transfer and outlet ports for such compression cylinder, an intermediate low pressure reservoir in communication with the transfer port in which works a plunger which is resiliently pressed so as to tend to force grease which is contained in the reservoir through the transfer port into the high pressure cylinder, and an inlet valve for the intermediate reservoir, means being provided so that reciprocation of the prime mover simultaneously works the piston in its high pressure cylinder and the plunger in its low pressure reservoir and thus feeds grease through both.

Preferably the whole grease gun is mounted on a platform or escutcheon plate adapted to be readily fixed on to a comparatively large rigid barrel-like container for the grease, such as a heavy oil drum or barrel.

The construction will be more readily understood by reference to an example which incorporates the invention. This example is shown in the drawings filed herewith, of which:

Figure 1 is a cross-sectional elevation, and

Figure 2 is a fragmental section showing separation of the constituent parts of the plunger during operation.

The whole grease gun is built up on a platform or escutcheon plate 1 adapted to be readily bolted on to a domed cover plate 2 by wing bolts 3. The cover plate 2 is itself adapted to be readily fixed on to an oil or grease barrel container 4 by a throw-over catch 5 and toggle links 6 working against a rim 7 on the cover plate. The container 4 may itself be a renewable drum as commercially supplied or may preferably be a permanent rigid container into which the commercial drums are placed as required. It will be seen therefore that when the oil or grease in the container in use is exhausted the grease gun can be readily transferred to a new container without difficulty.

A stand incorporating a steadying platform 8 can be provided if desired.

The grease gun proper comprises a hand lever 9 working about a swinging pivot 10 which is itself mounted on the end of a link 11 pivoted at a hinge pin 12. Intermediate of its length at a point to give considerable mechanical advantage is the working pivot 13 by which the operating lever 9, when worked, reciprocates a hollow rod 14. The inside of this hollow rod 14 itself forms the high pressure cylinder. The reciprocating hollow rod 14 also carries with it the plunger body 15 and associated parts. The stationary piston (or ram) 16 (i. e. stationary relative to the hollow rod 14) is fixed at its base, as hereinafter appears, so that it works within the high pressure cylinder or reciprocating hollow rod 14.

At the top of the high pressure cylinder 14 is an outlet with non-return valve (not shown) leading to the high pressure discharge nozzle 17 and if desired to a flexible connection 18.

Towards the base of the high pressure cylinder 14 is a transfer port 19 so positioned that it is uncovered by the piston 16 at the top of the stroke (see Figure 2) but covered by the piston 16 throughout the remainder of the stroke. Concentric with the high pressure cylinder 14 is the stationary intermediate low pressure cylindrical reservoir 20.

The plunger 15 fits with a grease tight joint and works within its low pressure reservoir 20, a rubber or similar ring 21 serving as a gland or piston ring.

Movement of the plunger 15 relative to the reciprocating rod 14 in the downward direction is limited by the plunger stop 22. This plunger stop 22 is rigidly fixed to the hollow rod 14 but grease can pass through the stop 22 through passages 22A.

Grease cannot pass between the plunger 15 and the hollow rod 14 nor can grease pass between the plunger 15 and the low pressure cylinder 20. The gland nut 23 assists to this end. The plunger 15, however, can slide relative to the low pressure cylinder 20 and can also slide relative to the high pressure hollow rod 14 and thus grease can enter between and separate the stop 22 and the plunger 15, as shown in Figure 2.

A coil spring 24 is provided tending to urge the plunger 15 and its associated parts downwardly towards the stop 22. It is anchored at its upper end against the rigid head 25. A gland nut 26 is provided in the head 25 to provide a grease tight gland through which reciprocation of the hollow rod can take place.

A non-return valve 27 is provided at the base of the low pressure cylinder 20 allowing ingress of grease through the grease inlet 28 but not allowing egress. A spring 29 is provided to seat the valve 27 upon its seating. The piston 16 is rigidly held on its retaining plate 30 through which are passages 31.

For purposes of illustrating the operation, use is visualised commencing from the most downward position of the operating handle 9 as shown in Figure 1. The handle is then raised, the hollow rod or high pressure cylinder 14 is raised, the piston 16 is withdrawn relative to the hollow rod or high pressure cylinder 14, the non-return valve in the outlet 17 closes and suction is built up on the upper side of the high pressure cylinder 14 until the piston 16 uncovers the transfer port 19. Grease which surrounds this port 19 is then sucked in through the transfer port 19, and the high pressure cylinder 14 is thus charged. During this upward suction stroke the plunger stop 22 is also pressed against and carries with it the plunger 15, against compression of the spring 24. At the same time suction is built up in the lower portion of the low pressure cylindrical container 20 causing the valve 27 to open and allowing grease to be drawn in to fill the lower portion of the low pressure cylindrical reservoir 20. Upon the operating lever 9 being depressed, the hollow rod 14 begins to descend. The port 19 is almost immediately covered and for the remainder of the stroke grease is rammed at high pressure out of the cylinder 14 through the non-return valve and ejected at high pressure through the high pressure nozzle 17 to do the work required. At the same time during the downward stroke, the valve 27 closes, the plunger stop 22 passes through the grease in the low pressure cylindrical reservoir 20 but the plunger 15 cannot descend further once the port 19 has been closed owing to the grease trapped. The hollow rod continues to descend leaving the plunger 15 being downwardly spring pressed by the spring 24 so that on the following upward stroke when the port 19 is again uncovered, there will be spring pressure tending to force grease from the low pressure cylinder 20 through the transfer port 19 to the high pressure cylinder 14.

It will be seen that by simple reciprocation of the hand lever grease is shifted from the oil or grease container (or primary reservoir) 4 first into the low pressure cylindrical intermediate reservoir and thence into the high pressure cylinder and thence at high pressure out of the discharge nozzle.

It may be desirable to provide above the grease in the grease container 4 a platform to assist in the homogeneous downward movement of the grease as it is used up from the bottom. Such platform may be downwardly sprung or otherwise pressed, or not, as desired, and it may make a fluid tight sliding fit within the oil container.

The complete grease gun can be transferred to a new barrel or vice versa when desired without the grease being handled and the whole construction therefore gives an extremely convenient agricultural plant, tractor and like lubricator which is also suitable over a wide range.

What I claim is:

1. A grease gun comprising a reciprocable high pressure compression cylinder, a piston within and coacting with said cylinder, means for reciprocating said cylinder relative to said piston, including a hand lever pivotally connected to said cylinder, said cylinder having transfer and outlet ports, a low pressure reservoir for grease in communication with said transfer port, a spring-pressed plunger reciprocable in said low pressure reservoir for forcing grease through said transfer port into the high pressure cylinder, said low pressure reservoir having an inlet for grease, and means actuated by said hand lever for causing relative movement between the cylinder and piston and simultaneously causing movement of the plunger in the low pressure reservoir for feeding grease through both the cylinder and reservoir.

2. A grease gun comprising a high pressure reciprocable compression cylinder, a piston coacting with said cylinder, a low pressure reservoir for grease around said cylinder, a plunger reciprocable in said reservoir, means for reciprocating said cylinder and said plunger, including a hand lever pivotally connected to said cylinder, said cylinder having an outlet port, a high pressure discharge nozzle connected to said outlet port, said cylinder having a transfer port communicating with said reservoir at a point where it will be uncovered by the piston at the end of the suction stroke of the cylinder and covered by the piston during the remainder of said stroke, said reservoir having an inlet port for the intake of grease from a source external of the gun when the plunger moves in the low pressure reservoir in a direction so as to produce a suction stroke, rigid means of connection between the plunger and hand lever during the suction stroke of the plunger, and a spring in the low pressure reservoir encircling the high pressure cylinder for pressing said plunger so as to eject grease during its exhaust stroke through said high pressure discharge nozzle, a resilient pressure at the same time being built up in the low pressure reservoir, so as to assist the passage of grease through the transfer port, when opened.

3. A grease gun comprising a hollow rod, a stationary ram within and coacting with said hollow rod, said hollow rod having an outlet port, a high pressure discharge nozzle connected to said outlet port, a stationary cylindrical low pressure reservoir for grease associated with said hollow rod, a plunger reciprocable in said reservoir, means in common for reciprocating said hollow rod and said plunger including a hand lever, said hollow rod having a transfer port operable by the ram at the end of the suction stroke of the ram within the hollow rod and closable by the ram during the remainder of the stroke, said reservoir having an inlet port for the intake of grease from a source external of the reservoir when the plunger moves in the low pressure reservoir in a direction so as to produce a suction stroke, rigid means of connection between the plunger and hollow rod during the suction stroke of the plunger, and a spring in the low pressure reservoir encircling the hollow rod for pressing said plunger so as to eject grease during its exhaust stroke through the high pressure charge nozzle, and simultaneously to build up a resilient pressure in the low pressure reservoir, so as to force grease through the transfer port, when opened, to the hollow rod, during the subsequent suction stroke.

4. A grease gun as defined in claim 3 wherein the hollow rod internally constitutes a high pressure cylinder and externally carries the plunger, and wherein the stationary low pressure reservoir is disposed around and is concentric with the reciprocating hollow rod.

References Cited in the file of this patent

UNITED STATES PATENTS

| | | |
|---|---|---|
| 1,362,077 | Bobrick et al. | Dec. 14, 1920 |
| 2,128,637 | Davis | Aug. 30, 1938 |
| 2,403,122 | Reisert et al. | July 2, 1946 |